R. LA SELVA.
CIRCUIT CLOSER FOR VEHICLE SIGNALS.
APPLICATION FILED MAY 20, 1919.
1,409,735.
Patented Mar. 14, 1922.
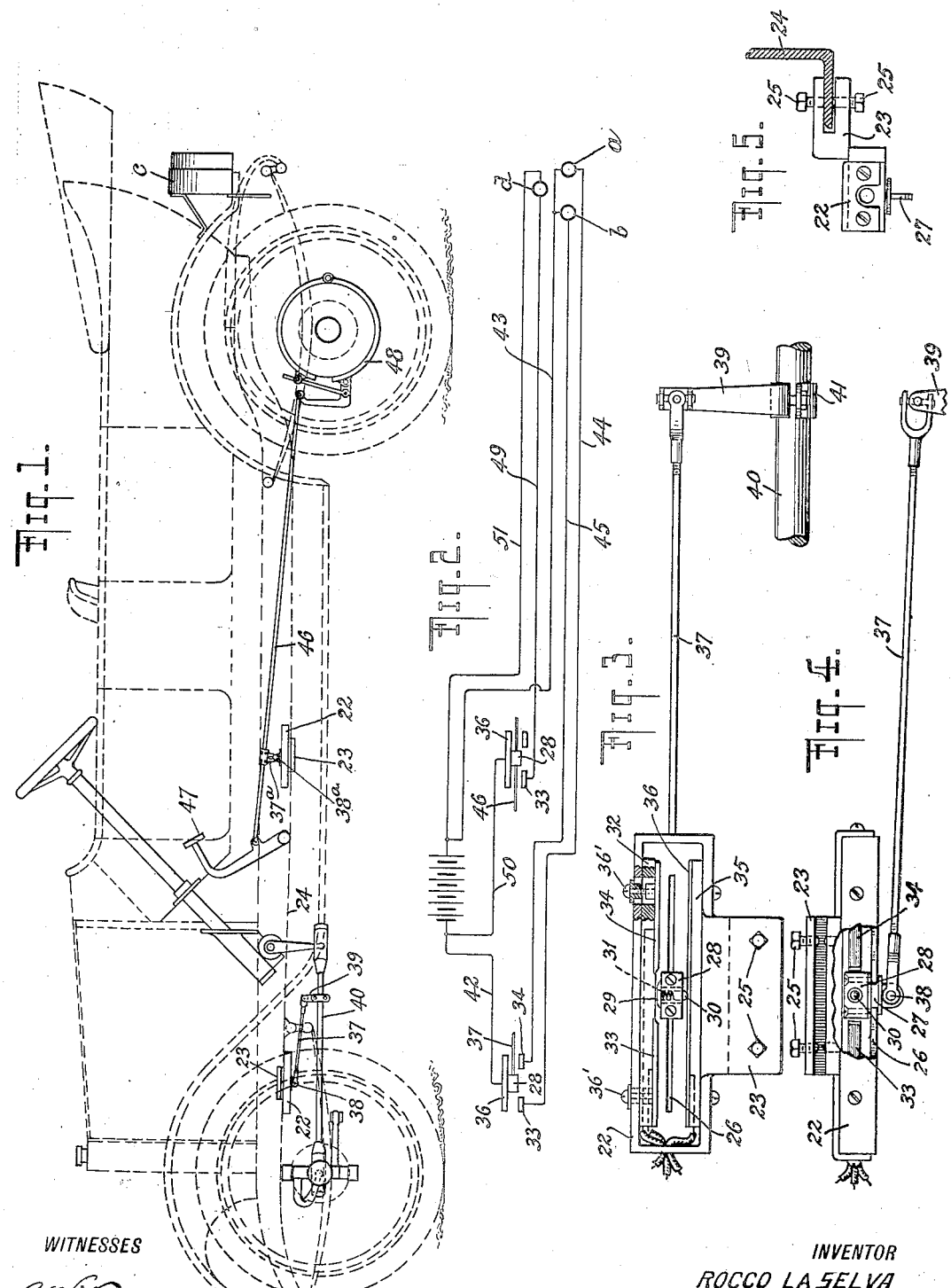
WITNESSES
INVENTOR
ROCCO LA SELVA
BY
ATTORNEYS

UNITED STATES PATENT OFFICE.

ROCCO LA SELVA, OF NEW YORK, N. Y.

CIRCUIT CLOSER FOR VEHICLE SIGNALS.

1,409,735.                  Specification of Letters Patent.   Patented Mar. 14, 1922.

Application filed May 20, 1919. Serial No. 298,376.

*To all whom it may concern:*

Be it known that I, ROCCO LA SELVA, a citizen of the United States, residing in the city, county, and State of New York, have invented certain new and useful Improvements in Circuit Closers for Vehicle Signals, of which the following is a specification.

In the operation of automobiles, particularly in urban districts where traffic is dense, the driver is obliged to slow-up or stop at frequent and unexpected intervals, either because of congestion in front of him or because he desires to leave the highway to the one side or the other. In such cases it is usual to signal vehicles in the rear by raising and extending the arm outwardly through the car. Such signals, however, are not always seen or capable of being seen and, when the car top is up, or if the car is of the closed type, are practically incapable of being made; such signals, furthermore, are tiring and the necessity of making them tends to distract the attention of the driver. They also interfere, to a certain extent, with his control of the steering gear.

These hand signals, furthermore, are obviously ineffective as an indication that the driver intends to leave the highway to right or left.

The object of my invention, about to be described, is to provide a simple and efficient means whereby a signal mounted at a convenient point upon a car is automatically actuated or displayed whenever the car is slowed or stopped, or steered to the right or left, whether in the daytime or at night, and without conscious attention on the part of the driver.

My invention will be fully described hereinafter and the features of novelty will be pointed out in the appended claim. The present application is a continuation of another application filed by me in the United States Patent Office on May 6, 1918, Serial No. 232,690, and issued on July 8, 1919, as Patent No. 1,308,873.

For the purpose of illustration and description, I have shown my signal operating means in conjunction with a rear light, for instance, such as is included in my prior application above referred to, it being understood that this is only an example and that said operating means may be utilized with equal efficiency for automatically operating or displaying other types of signals, or signals otherwise located on an automobile, than illustrated in the drawing.

My invention will be better understood by referring to the accompanying drawings, in which Fig. 1 represents a side elevation of an automobile having a preferred form of my invention attached thereto; Fig. 2 shows the several signal lamps constituting the rear light above mentioned, their circuits and operating means, in diagrammatic form; Fig. 3 is an enlarged plan view of my improved operating means arranged to control the "right" and "left" signals; Fig. 4 represents the showing of Fig. 3 viewed from the front; and Fig. 5 is an end view representing my improved operating means attached to the chassis, a part of which is shown in section.

As shown in the drawings, my improved signal controlling means comprises a switch casing, 22, having an attached slotted bracket, 23, adapted to fit over one of the legs or flanges of the chassis side bar, 24, at the desired location, any suitable fastening devices, such as set screws, 25, being utilized to detachably clamp the bracket in position on said flange.

The switch casing, 22, is slotted at, 26, for instance, along one side thereof so as to receive slidably the shank, 27, of a switch member, 28, upon one side of which is mounted a contact stud 29. A depressible contact stud, 30, is mounted on the other side of the switch member and is yieldingly and permanently connected with contact stud, 29, by means of a spring, 31, which tends to press said studs apart.

Mounted upon the inside of the casing at one side thereof upon an insulating block, 32, attached thereto, is a pair of spaced auxiliary contact members or strips, 33, 34. These members or strips are linearly adjustable upon the block, 32, so as to vary their distance apart and from the center of the switch, set screws, 36', being used to clamp the strips or members fast at any desired point. On the other side of the casing and mounted also upon an insulating block, 35, is a continuous main contact member or strip, 36, which extends in juxtaposition to said members, 33 and 34, preferably throughout their length as shown in Fig. 3.

As shown in Figs. 1, 3 and 4, my improved signal operating means is operatively connected with the steering gear of the vehicle for the purpose of automatically controlling the "right" and "left" signals $a$ and $b$ of an automobile signal $c$, in harmony with the change of direction of travel of the vehicle, as the steering gear is operated. Thus one end of a link 37 is pivotally connected at 38 with the shank 27, the other end of said link 37 being pivotally attached, preferably by means of a universal joint, with one end of an arm 39; the latter in the illustrated example, is shaped to fit over the drag link 40 and is secured thereto by means of a clamping member 41. The arm, 39, is clamped fast upon the drag link at such a point that, when the automobile is pointing straight ahead, the switch member, 28, will be midway between the two contact strips 33, 34.

A circuit wire, 42, is carried from one side of the battery to the continuous contact member or strip, 36, while another wire, 43, extends from the other side of said battery to the "left" and "right" lamps $a$ and $b$; additional wires, 44, 45, for the "left" and "right" lamps $a$ and $b$, respectively, are connected with the spaced contact strips, 33, 34 (see Fig. 2). Hence, when the switch member, 28, is sufficiently distant from the center of the switch casing to enable the two contact studs, 29, and, 30, and the spring, 31, to connect together the continuous contact strip, 36, with the contact strip, 34, the "right" signal lamp will be energized, thus illuminating the legend "Right". And when, on the other hand, the switch member, 28, is sufficiently distant from the center of the switch casing in the other direction to enable the continuous contact strip, 36, and the shorter contact strip, 33, to be connected together, the "left" signal lamp will be energized, thus illuminating the legend "Left".

This position of the switch member, 28, "off center" in the switch casing as described, will be brought automatically about by the movement of the drag link 40 actuated through the medium of the steering wheel when the latter is operated to turn the car to the right or left as the case may be.

The degree to which the car must be turned to right or left in order to illuminate the corresponding "right" and "left" legends will, of course, depend upon the distance apart of the shorter strips, 33, and, 34, and the distance of each of said strips from the center. Preferably they should be so set that the signals will not be operated for slight changes of direction such as take place on a crowded highway when it is necessary to pass a vehicle ahead or to permit a vehicle behind to pass.

Instead of connecting the switch member, 28, to the drag link, as shown and described, I may connect it with any other member which is controlled by and moves in correspondence with the steering gear.

As shown in Fig. 1, my signal operating means is shown in operative connection with the braking mechanism of the vehicle, for the purpose of actuating or displaying the "stop" signal each time the brake is applied to bring the vehicle to a complete stop or to reduce the speed thereof. In this case the switch casing 22 is also clamped to a flange of a suitable part of the chassis, at the proper point, by means of the set screws, 25, and the shank, 27, is pivotally connected at 38$^a$ with an arm or link 37$^a$ carried by the brake bar 46. It will be understood that a foot pedal, 47, or its equivalent, serves to actuate the brake-bar 46 in the usual manner to apply the brake 48. With the arrangement last described, the operating means comprises part of a circuit including the wires, 49, 50 and 51, connected respectively with one of the members, 33 or 34, and the continuous member 36, the "stop" lamp $d$ and the battery hereinbefore mentioned.

Obviously as the foot pedal 47 or its equivalent is actuated to apply the brake a linear movement will be imparted to the brake-bar, 46, and communicated by means of the arm 37$^a$ to the switch member, 28. The latter will thereby be moved lengthwise of the contact member 36 and into contact with one of the contact members, 33 or 34, as the case may be, it being understood that only one of the latter is required in the embodiment of my invention now being described. As the member, 28, is thus shifted, the electrical circuit will be closed and the lamp $d$ thus energized to display the "stop" signal. This operation takes place automatically each time the brake is applied, either to bring the vehicle to a complete stop, or to reduce its speed of travel, this depending on the adjustment of the contact, 33 or 34, with respect to the centre of the casing, 22, or to the neutral position of the switch member, 28.

My invention is extremely simple in construction and efficient in operation, is readily attached to a vehicle and operatively combined with the steering gear and braking mechanism as illustrated or with any other working part of said vehicle, and in all cases provides an automatic means whereby predetermined results are positively obtained without requiring any special attention on the part of the driver of the automobile.

It will be understood that my invention may be used to control any type of signal other than the one shown and also that a plurality of signals may be coincidentally controlled thereby.

The signal $c$, used in the illustrated example, may be of the same general construction as disclosed in my prior application hereinbefore mentioned, or it may comprise any other suitable arrangement.

Various changes in the specific form shown and described may be made within the scope of the claim without departing from the spirit of my invention.

I claim:

A circuit closer for signals comprising a casing provided with a slot, a single contact member in said casing extending parallel to said slot, a pair of contact members in said casing spaced from and parallel with said single contact member, said pair of contact members projecting toward each other and having their opposed ends spaced apart, a switch member slidable between said contact members, a contact stud carried by said switch member and arranged to contact with one or the other of said pair of contact members, a depressible contact stud carried by said switch member and having continuous contact with said single contact member, a spring carried by said switch member in engagement with said studs and tending to force them apart; a shank extending through said slot and connected with said switch member and a rod connected with said shank for actuating said switch member.

In testimony whereof I have hereunto set my hand.

ROCCO LA SELVA.